United States Patent
Liu et al.

(10) Patent No.: US 9,750,022 B2
(45) Date of Patent: Aug. 29, 2017

(54) HIGH-DENSITY WIRELESS BAND STEERING BASED ON WIRELESS DEVICE ADDRESS

(71) Applicant: Cisco Technology, Inc., San Jose, CA (US)

(72) Inventors: Hui Liu, San Jose, CA (US); Jiatong Zhou, New South Wales (AU); Jiang Zhu, Sunnyvale, CA (US); Tak Ming Francis Pang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 14/454,589

(22) Filed: Aug. 7, 2014

(65) Prior Publication Data
US 2016/0044673 A1    Feb. 11, 2016

(51) Int. Cl.
*H04W 72/04*     (2009.01)
*H04W 16/14*     (2009.01)
*H04W 16/02*     (2009.01)
*H04W 88/08*     (2009.01)
*H04W 72/00*     (2009.01)

(52) U.S. Cl.
CPC ....... *H04W 72/0453* (2013.01); *H04W 16/02* (2013.01); *H04W 16/14* (2013.01); *H04W 72/00* (2013.01); *H04W 88/08* (2013.01)

(58) Field of Classification Search
CPC ......... H04W 4/00; H04W 8/26; H04W 88/06; H04L 5/0064
See application file for complete search history.

(56) References Cited

U.S. PATENT DOCUMENTS

| | | | |
|---|---|---|---|
| 2007/0177524 A1* | 8/2007 | Qian | H04L 43/0811 370/252 |
| 2009/0252097 A1 | 10/2009 | Iyer et al. | |
| 2011/0235591 A1* | 9/2011 | Iyer | H04L 5/0064 370/328 |
| 2012/0322481 A1 | 12/2012 | Laroche et al. | |
| 2014/0059218 A1* | 2/2014 | Ganu | H04W 76/04 709/224 |

(Continued)

OTHER PUBLICATIONS

Meraki, "Dual band operation with Band Steering", [online], Knowledge Base, Jul. 18, 2014 [retrieved on Aug. 7, 2014]. Retrieved from the Internet: <URL: https://kb.meraki.com/knowledge_base/dual-band-operation-with-band-steering>, pp. 1-2.

(Continued)

*Primary Examiner* — Lakeram Jangbahadur
(74) *Attorney, Agent, or Firm* — Leon R. Turkevich

(57) ABSTRACT

In one embodiment, a method comprises determining, by an apparatus, a pattern of frequency band capabilities of wireless client devices relative to respective wireless Media Access Control (MAC) addresses of the wireless client devices, the determining based on a machine-based classification of the wireless client device capabilities relative to the respective MAC addresses; classifying a new wireless client device based on classifying the corresponding MAC address of the new client device relative to the pattern; and steering the new wireless client device to an available wireless band based on the classifying of the new wireless client device.

20 Claims, 4 Drawing Sheets

(56) References Cited

U.S. PATENT DOCUMENTS

2015/0119035 A1* 4/2015 Ganu ................. H04W 36/30
455/436

OTHER PUBLICATIONS

Estrada, "Using Spectrum Wisely With Band Steering", [online], Apr. 13, 2011 [retrieved on Aug. 7, 2014]. Retrieved from the Internet: <URL: https://meraki.cisco.com/blog/2011/04/using-spectrum-wisely-with-band-steering>, pp. 1-9.
Narcisi, "Wireless band steering can ensure faster speeds for new devices", [online], SearchNetworking.com, Feb. 14, 2014 [retrieved on Aug. 7, 2014]. Retrieved from the Internet: <UTL: http://searchnetworking.techtarget.com/news/2240214403/Wireless-band-steering-can-ensure-faster-speeds-for-new-devices?vgnextfmt=print>, pp. 1-5.

* cited by examiner

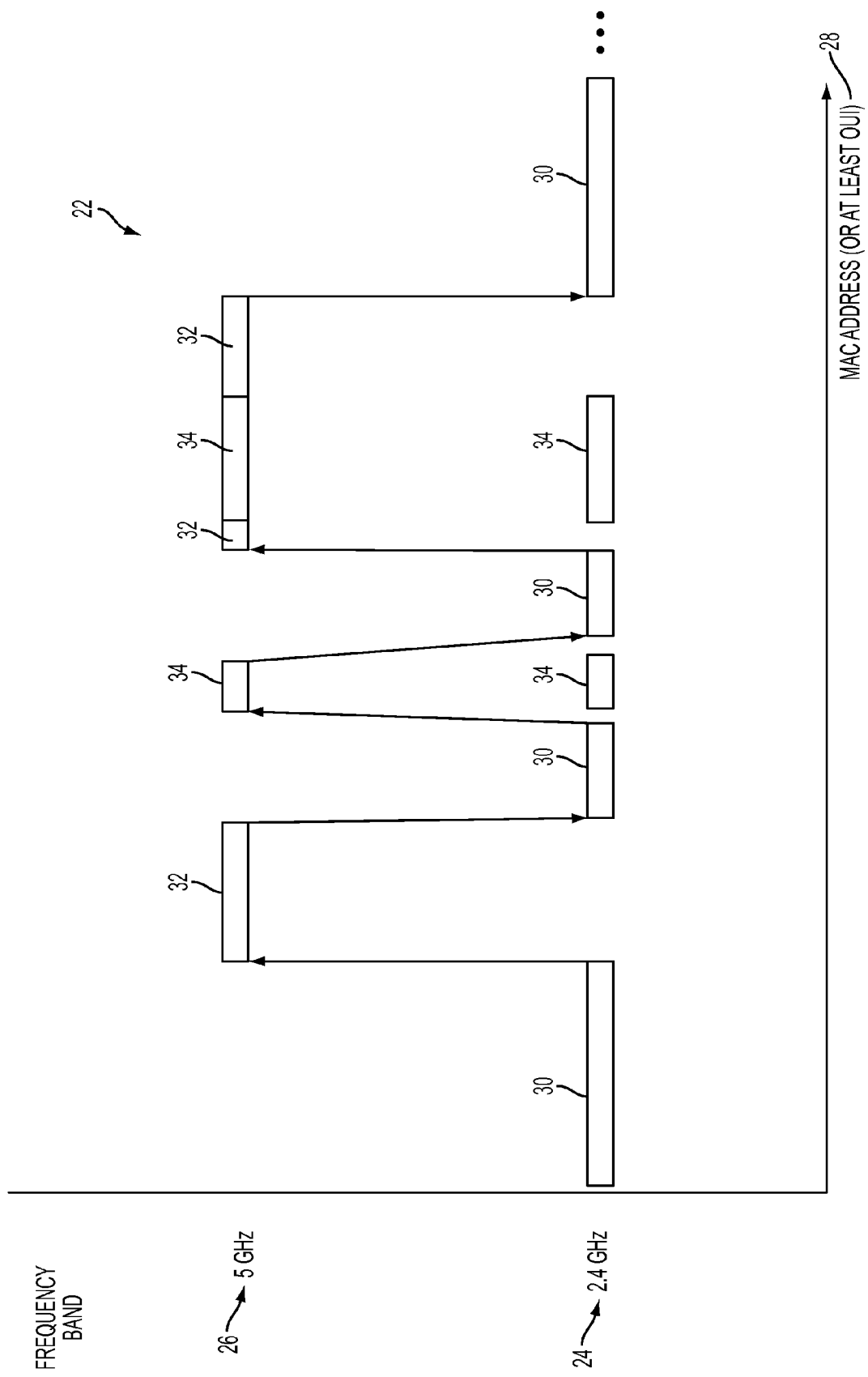

US 9,750,022 B2

HIGH-DENSITY WIRELESS BAND STEERING BASED ON WIRELESS DEVICE ADDRESS

TECHNICAL FIELD

The present disclosure generally relates to band steering, namely causing a wireless device to attach to an access point using a wireless band chosen by a device distinct from the wireless device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Multiple-band wireless client devices (e.g., wireless computer devices, wireless telephony devices, wireless host sensor devices, etc.) having two or more frequency bands (e.g., 2.4 GHz band or "2.4 G", and 5 GHz band or "5 G") often will choose a lower frequency band, even if a higher frequency band is available. Consequently, multiple-band wireless client devices not only fail to employ the advantages of a higher frequency band, but also must suffer the disadvantages of a lower frequency band, for example greater congestion from other lower-band client devices, wireless interference, etc.

BRIEF DESCRIPTION OF THE DRAWINGS

Reference is made to the attached drawings, wherein elements having the same reference numeral designations represent like elements throughout and wherein:

FIG. 4 illustrates an example pattern of frequency band capabilities of wireless client devices as determined by the machine of FIG. 2, according to an example embodiment.

DESCRIPTION OF EXAMPLE EMBODIMENTS

Overview

Figure 1:
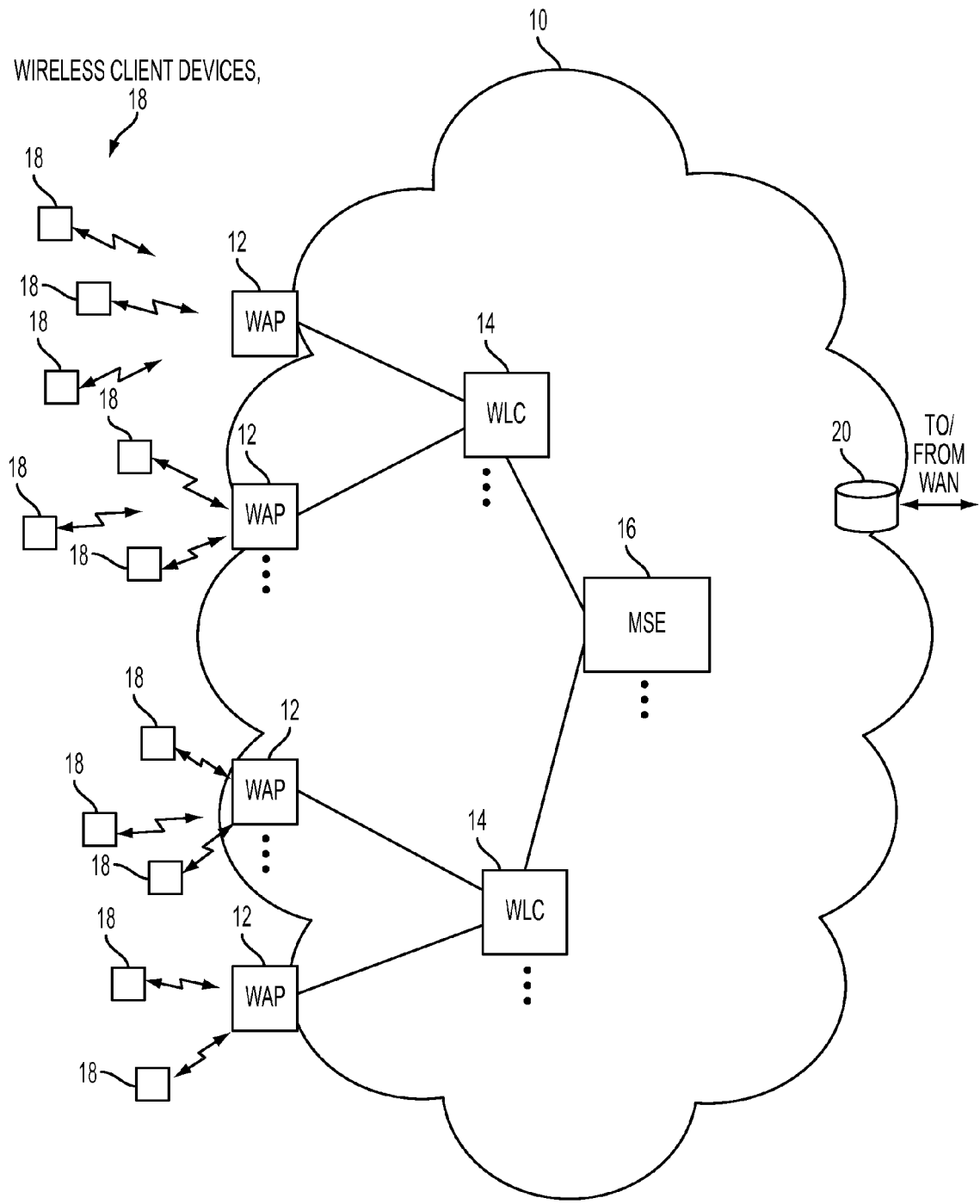
FIG. 1 illustrates an example system having an apparatus configured for steering a new wireless client device to a wireless frequency band optimized for the new wireless client device based on a Media Access Control (MAC) address of the new wireless client device, according to an example embodiment.

In one embodiment, a method comprises determining, by an apparatus, a pattern of frequency band capabilities of wireless client devices relative to respective wireless Media Access Control (MAC) addresses of the wireless client devices, the determining based on a machine-based classification of the wireless client device capabilities relative to the respective MAC addresses; classifying a new wireless client device based on classifying the corresponding MAC address of the new client device relative to the pattern; and steering the new wireless client device to an available wireless band optimized for the new wireless client device based on the classifying of the new wireless client device.

In another embodiment, an apparatus comprises a device interface circuit, and a processor circuit. The processor circuit is configured for determining a pattern of frequency band capabilities of wireless client devices relative to respective wireless Media Access Control (MAC) addresses of the wireless client devices, the processor circuit configured for determining the pattern based on executing a machine-based classification of the wireless client device capabilities relative to the respective MAC addresses. The processor circuit further is configured for causing classifying of a new wireless client device based on classifying the corresponding MAC address of the new client device relative to the pattern; the processor circuit further is configured for causing steering of the new wireless client device to an available wireless band optimized for the new wireless client device based on the classifying, based on outputting a response via the device interface circuit.

In another embodiment, logic is encoded in one or more non-transitory tangible media for execution by a physical machine and when executed by the physical machine operable for: determining a pattern of frequency band capabilities of wireless client devices relative to respective wireless Media Access Control (MAC) addresses of the wireless client devices, the determining based on a machine-based classification of the wireless client device capabilities relative to the respective MAC addresses; classifying a new wireless client device based on classifying the corresponding MAC address of the new client device relative to the pattern; and steering the new wireless client device to an available wireless band based on the classifying of the new wireless client device.

DETAILED DESCRIPTION

Particular embodiments enable high density wireless band steering of wireless devices based on classifying the wireless devices relative to their wireless device address. In the example case of link layer wireless media access control (MAC) addresses, IEEE 802 specifies that the first three octets, or 24 bits, of a link layer MAC address (in transmission order) is an Organizationally Unique Identifier (OUI) that represents the manufacturer of the wireless MAC device providing the wireless link layer connections.

One attempt at band steering a multiple-band wireless client device to a higher band (e.g., 5 G) involves a wireless access point (AP) suppressing a lower-band probe response (e.g., a 2.4 G probe response): instead of immediately responding to a detected lower-band probe message (e.g., 2.4 G probe message) from a wireless client device, the wireless AP suppresses the lower-band probe response while waiting an extended wait interval to determine whether the wireless client device outputs a higher-band probe message (e.g., 5 G probe message); if during the extended wait interval a higher-band probe message is detected by the wireless AP, the wireless AP classifies the wireless client device as a multiple-band wireless client device (e.g., dual-band device) and the wireless AP outputs a higher-band probe response; if after the extended wait interval no higher-band probe message is detected by the wireless AP, the wireless AP classifies the wireless client device as a single-mode device and outputs the lower-band probe response. This approach, however, causes substantial delays for all wireless client devices attempting to attach to the wireless AP; further, since the wireless AP must store the wireless device address while waiting during the extended wait interval, in a high-density network the large number of wireless client devices attempting to join the same wireless AP may overwhelm the relatively limited memory size embedded in the wireless AP. Hence, this approach is not suitable for high density networks having numerous wireless client devices.

As described herein, machine-based classification can be used in high-density network environments to create a "pattern" of frequency band capabilities relative to respective MAC addresses of the wireless client devices, effectively creating a "model" that predicts the frequency band capabilities of a wireless client device based on its corresponding MAC address. The pattern of frequency band capabilities can be used to steer a new wireless client device to an available wireless band that is optimized for the new wireless client device, without the necessity of waiting for multiple probe messages to determine the capabilities of the new wireless client device.

FIG. 1 is a diagram illustrating an example network 10 having network devices 12, 14, and/or 16, enabling steering of wireless client devices 18 to an available wireless band optimized for the wireless client device 12, according to an example embodiment. The example network 10 can be implemented as a local area network (LAN) and/or wide-area network (WAN) at a large venue, for example a sports stadium, a university or corporate campus, etc. The example network 10 also can include one or more routers 20 for routing traffic in the network 10 to and from a wide area network (not shown).

As illustrated in FIG. 1, the network 10 can include a wireless access point (WAP) 12, a wireless LAN controller (WLC) 14, and mobility service engine (MSE) 16. Depending on implementation, any one of the WAP 12, WLC 14, and/or MSE 16 (or combination thereof) can determine a pattern (22 of FIG. 4) of frequency band capabilities (24 and/or 26 of FIG. 4) of wireless client devices 18, relative to their MAC addresses (28 of FIG. 4), based on machine-based classification of each wireless client device 18 relative to its corresponding MAC address 28. As described in further detail below with respect to FIGS. 3 and 4, as the network devices 12, 14, and/or 16 obtain a sufficiently large number of "data samples" identifying the frequency band capability of a wireless client device 18 relative to its MAC address 28, any one of the WAP 12, WLC 14, and/or MSE 16 can determine a pattern 22 or "model" that represents the frequency band capabilities 24 and/or 26 of a wireless client device 18 relative to its MAC address 28 (or at least a portion thereof, for example based on the OUT): the determined pattern 22 of frequency band capabilities 24 and/or 26 enables a new wireless client device to be classified based on its corresponding MAC address 28 as low-band-only capable 30, high-band-only capable 32, or multi-band capable (e.g., dual band) 34. Hence, a wireless client device 18 can be steered to an available wireless band 24 or 26 optimized for the wireless client device, based on classifying the new wireless client device 18 to one of the capability classes 30, 32, or 34.

Hence, the steering of the wireless client device 18 to an available wireless band 24 or 26 optimized for the wireless client device 18 can be accelerated in response to detecting the corresponding wireless MAC address 28, without waiting for additional probe messages indicating the capabilities of the wireless client device 18. A low-band-only capable 30 wireless client device 18 operating only in a low band (e.g., 2.4 GHz) 24 therefore can receive a low-band probe response from a wireless access point (WAP) 12 that does not need to wait for any higher-band probe request; further, a high-band-only capable 32 wireless client device 18 operating only in a high band (e.g., 4.915-5.825 GHz band, or "5 GHz" band) 26 or a multi-band capable 34 wireless client device 18 can receive a high-band probe response from the WAP 12 in an accelerated manner, since the WAP 12 does not need to wait for both a low-band probe and a high-band probe to determine the capabilities of the wireless client device 18. The accelerated steering of the wireless client device 18 to an optimized wireless band 24 or 26 is particularly effective in high-density networks having a large number (e.g., hundreds or thousands) of wireless client devices 18 that can quickly overwhelm the more commonly available lower frequency band (e.g., 2.4 GHz) 24, especially in large public venues such as a sports stadium, university auditoriums, etc.

Hence, in a high-density network environment having a large number of wireless client devices 18, the example embodiments enable a wireless client device 18 to be classified to its optimized available wireless band based solely on the MAC address 28 of the client device 18. The example embodiments also can be deployed concurrently alongside existing technology, enabling wireless client devices 18 to connect to any WAP 12 even if the a new wireless client device 18 is incorrectly classified, for example due to an initial insufficient number of data samples identifying frequency band capability relative to MAC address 28. As described below, initial errors due to bias in limited data sets can be mitigated based on prescribed decomposition formats used to create feature vector representations of the MAC addresses, and/or the machine-based classification used during determination of the pattern of frequency band capabilities (e.g., binary classification using decision trees, neural networks, Bayesian networks, or support vector machine).

Figure 2:
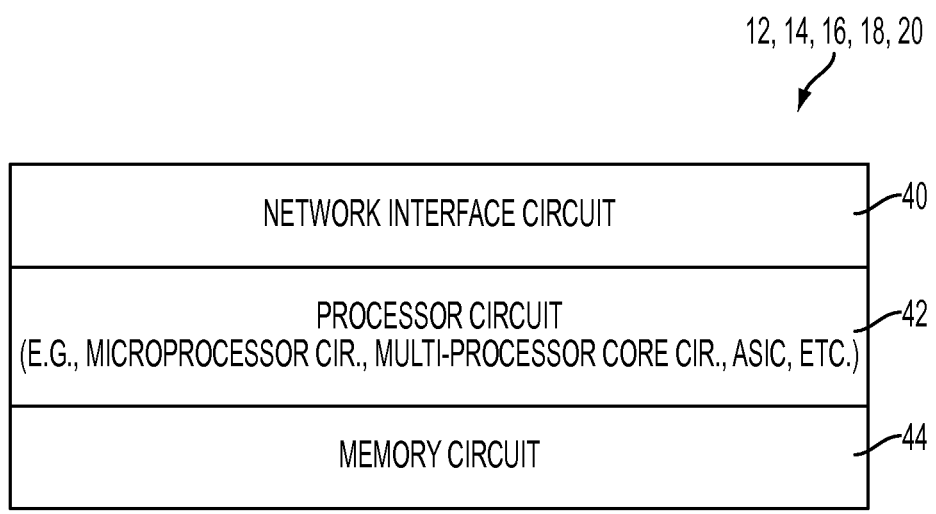
FIG. 2 illustrates an example machine implementation of any one of the network devices of FIG. 1, according to an example embodiment.

FIG. 2 illustrates an example implementation of any one of the devices 12, 14, 16, 18, and/or 20 of FIG. 1, according to an example embodiment. Each network device 12, 14, 16, 18, 20 is a physical machine (i.e., a hardware device, apparatus) configured for implementing network communications with other physical machines 12, 14, 16, 18, and/or 20 via the network 10. The term "configured for" or "configured to" as used herein with respect to a specified operation refers to a device and/or machine that is physically constructed and arranged to perform the specified operation. Hence, each apparatus 12, 14, 16, 18 and/or 20 is a network-enabled machine implementing network communications via the network 10.

Each apparatus 12, 14, 16, 18, and/or 20 can include a network interface circuit 40, a processor circuit 42, and a memory circuit 44. The network interface circuit 40 can include one or more distinct physical layer transceivers for communication with any one of the other devices 12, 14, 16, 18, and/or 20, as needed; for example, the network interface circuit 40 of the WAP 12 can include two or more IEEE based wireless transceivers for communications at a low-band (e.g., 2.4 GHz) and a high-band (e.g., 5 GHz), and a wired transceiver for communications with the WLC 14, the MSE 16, and/or any other network device in the network 10. The network interface circuit 40 of the WLC 14 and the MSE 16 can include a wired transceiver for communications within the network 10. The wired transceivers used for communications within the network 10 can be of different types (e.g., a physical electrical link, an optical link, etc.); an alternate wireless communication also can be used in the network 10 (e.g., 4 G, microwave, etc.), as appropriate. As described previously, the network interface circuit 40 in the wireless client devices can be low-band-only capable (e.g., 2.4 GHz) wireless transceivers, high-band-only capable (e.g., 5 GHz) wireless transceivers, or multi-band capable at the low band and/or high band (or other frequencies, as appropriate). Other wireless frequencies also can be employed.

The processor circuit 42 can be configured for executing any of the operations described herein, and the memory circuit 44 can be configured for storing any data or data packets as described herein.

Any of the disclosed circuits of the devices 12, 14, 16, 18, and/or 20 (including the network interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
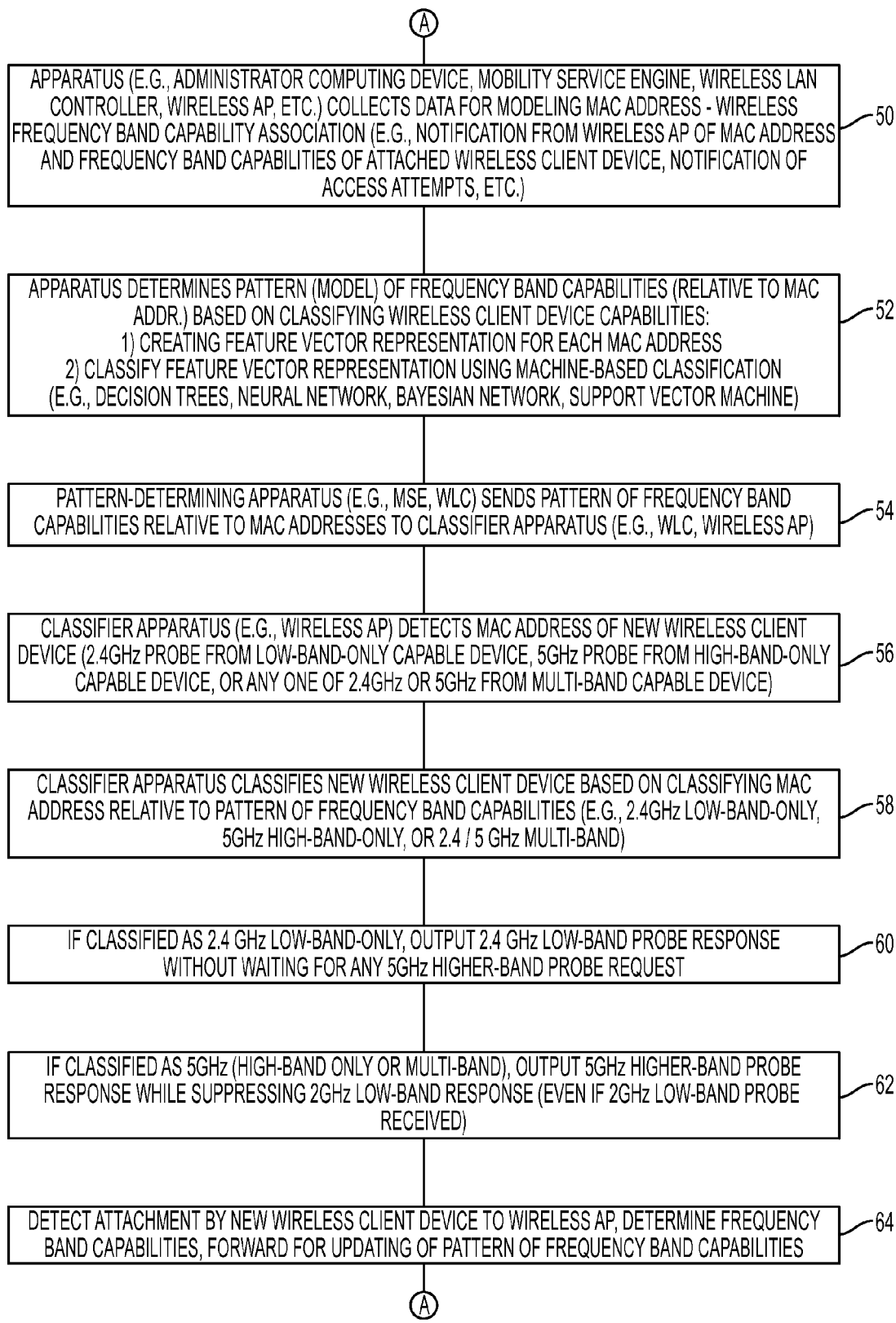
FIG. 3 illustrates an example method by the machine of FIG. 2, according to an example embodiment.

FIG. 3 illustrates an example method by any one of the WAP 12, the WLC 14, and/or the MSC 16 of FIGS. 1 and 2, according to an example embodiment. The operations described with respect to FIGS. 1-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIGS. 1 and 3, the processor circuit 42 of the WAP 12, the WLC 14, and/or the MSC 16 can be configured for collecting data samples in operation 50 for determining the pattern 22 of frequency band capabilities 24 and/or 26 of wireless client device 18 relative to their MAC addresses 28. In one embodiment, all of the disclosed operations can be implemented in the WAP 12; in another embodiment, different operations can be distributed or partitioned among the WAP 12, WLC 14, and/or the MSC 16 to reduce the processing and/or storage requirements of the WAP 12, to enable distributed processing within the network 10, etc. Hence, in one example the processor circuit 42 of the WAP 12, in response to detecting an attachment of a new wireless client device 18 to the WAP 12, can detect the frequency band capabilities of the new wireless client device 18 in response to the attachment, and forward the frequency band capabilities via the device interface circuit 40 in the form of an attachment notification to the WLC 14.

The WLC 14 can be configured for detecting the attachment of the new wireless client device to a connected WAP 12 and determining the frequency band capabilities based on the received attachment notification from the WLC 14: in one embodiment, the WLC 14 can collect the data samples for determining the pattern 22 of frequency band capabilities by the processor circuit 42 of the WLC 14; in another embodiment, the WLC 14 can forward one or more data samples (e.g., an aggregation of the data samples) to the MSE 16 for determining the pattern 22 by the processor circuit 42 of the MSE 16. Hence, the determining of the pattern 22 of frequency band capabilities relative to a MAC address 28 can be based on an accumulation of data samples identifying the frequency band capabilities of an attached client device 18 relative to its corresponding MAC address 28.

The processor circuit 42 of the apparatus determining the pattern 22 (e.g., the WAP 12, the WLC 14, and/or the MSE 16) (the "pattern-determining apparatus") in operation 52 can determine the pattern 22 of frequency band capabilities 24 and/or 26 relative to the MAC address 28 based on classifying the wireless client device capabilities. In particular, the processor circuit 42 of the pattern-determining apparatus first can create a feature vector representation for each of the MAC addresses 28 according to a prescribed decomposition format, followed by classifying the feature vector representations according to any one of multiple binary classification techniques, for example decision trees, neural networks, Bayesian networks, and/or support vector machine. For example, the 48-bit MAC addresses of the accumulated data sets can be divided (i.e., decomposed) into logical formats or components according to a prescribed decomposition format, including dividing into bits, dividing into characters, and/or dividing into 8-bit octets. The MAC address 28 (and/or its associated logical components) also can be represented either nominally or numerically. The choice of feature vector is implementation-specific based on performance versus time trade-off preferences.

The processor circuit 42 of the pattern-determining apparatus also can utilize different machine-based classification techniques, including classifying the feature vector representations according to any one or more of decision trees, a (multilayer perceptron) neural network, a Bayesian network, or set a support vector machine. Example decision trees can include J48, SimpleCart, Alternating Decision Tree, and/or Best First Tree. A multilayer perceptron-based neural network also can be utilized for a feature vector representation is listing 12 input features, with a learning rate of 0.3 and 10 fold cross validation. Given that the first three octets in transmission order of a MAC address 28 is the OUT representing the manufacture of the wireless transceiver device, Bayesian networks can be useful in classifying MAC addresses since there may be conditional dependencies between the first three octets and the last three octets of the MAC address 28, even with variances in MAC address patterns between manufacturers. The support vector machine can utilize a "kernel trick" to transform the input data (the feature vector reprint edition) into a highly dimensional space, in order to find an optimal boundary between possible outputs.

Other techniques can be used by the processor circuit 42 of the pattern-determining apparatus to reduce bias, including undersampling or oversampling of data, as appropriate. However, utilizing a larger sample set reduces sampling bias to ensure that no single group of wireless client devices form a dominating band that distorts prediction results. Hence, if the data sample sets are not biased and the number of data samples is sufficiently large over time, higher accuracy can be obtained (greater than 96.47%) in determining the frequency band capabilities of a wireless client device relative to its MAC address.

Hence, the processor circuit 42 of the pattern-determining apparatus, after having received a sufficient number of samples of frequency band capabilities of wireless client devices relative to MAC addresses 28, can execute in operation 52 a machine-based classification of the wireless client device capabilities (relative to the respective MAC addresses) to determine the pattern 22 of frequency-based capabilities 24 and/or 26 relative to the MAC address 28, where each wireless client device 18 is classified based on its corresponding MAC address 28 either as low-band-only capable 30, hi-band-only capable 32, or multi-band capable 34.

The processor circuit 42 of the pattern-determining apparatus in operation 54 can send the pattern 22 of frequency band capabilities (relative to MAC addresses 28) to the relevant classifier apparatus (e.g., one or more WLCs 14 and/or one or more WAPs 12): for example, if the MSE 16 is implemented as the pattern-determining apparatus, the MSE 16 can send the pattern 22 (or at least a representation and/or portion thereof) to one or more WLCs 14 and/or one or more WAPs 12; if one or more WLCs 14 is implemented as a pattern-determining apparatus (e.g., in a distributed environment, the WLC can send the pattern 22 (or at least a representation and/or portion thereof) to one or more WAPs 12, another WLC 14, the MSE 16, etc.

The pattern 22 enables the processor circuit 42 of the classifier apparatus (e.g., a WAP, a WLC 14, and/or the MSE 16) to classify a new wireless client device 18 based on applying the corresponding MAC address 28 of the new wireless client device 18 to the pattern 22 in order to determine the capability class 30, 32, or 34. The new wireless client device 18 can be detected in operation 56 by the WAP 12 detecting any message from the received wireless client device, including a low-band (e.g., 2.4 GHz) probe message, a high-band (e.g., 5 GHz) probe message, or any other message specifying the corresponding MAC address of the wireless client device 18 within the source MAC address field of a received IEEE 802 frame. As described previously, the classifier apparatus can be implemented within different network devices. For example, if the WLC 14 and/or the MSE 16 is configured as the classifier apparatus, the processor circuit 42 of the WAP 12 detecting the new wireless client device 18 can forward the corresponding MAC address to the classifier apparatus for classification in operation 58 of the new wireless client device as low-band-only capable 30, hi-band-only capable 32, or multi-band capable 34. Hence, the classifying of the wireless client device 18 enables immediate steering of the new wireless client device to an available frequency band that is optimized for the new wireless client, without the necessity of waiting for additional probe messages. If the classification in operation 58 is executed by a device other than the WAP 12 in wireless communication with the new wireless client device 18, the classifier apparatus can send the classification result to the WAP 12.

In response to the WAP 12 determining the classification result (either locally by its internal processor circuit 42 or a received classification result from a WLC 14 or MSE 16), the WAP 12 can output via its device interface circuit 40 the appropriate probe response (in operation 60 or 62) that steers the new wireless client device to an available wireless band optimized for the new wireless client device. If in operation 60 the new wireless client device 18 is classified (based on its MAC address) as low-band-only capable 30, the processor circuit 42 of the WAP 12 can output a low band (e.g., 2.4 GHz) probe response without waiting for any other high band (e.g., 5 GHz) probe requests from the wireless client device 18, enabling the wireless client device 18 to attach immediately to the WAP 12 using the lower band 24. If in operation 62 the new wireless client device 18 is classified (based on its MAC address 28) as hi-band-only capable 32, or multi-band capable 34, the processor circuit 42 of the WAP 12 can output a higher-band (e.g., 5 GHz) probe response: note that if the new wireless client device 18 is classified as multi-band capable by the processor circuit 42 in response to receiving a higher-band (e.g., 5 GHz) probe request from the new wireless client device 18, the higher-band (e.g., 5 GHz) probe response can be output while suppressing a low-band (e.g., 2.4 GHz) response to a low-band (e.g., 2.4 GHz) probe that was received from the new wireless client device 18. As described herein, the multiple-band capable classification 34 is defined as a transceiver that operates the available bands 24 and 26 simultaneously, i.e., the two or more wireless transceivers are operating on the respective frequency bands 24 and 26 at the same time; hence, assuming a wireless client device 18 outputs both a low-band (e.g., 2.4 GHz) probe request followed later by a higher-band (e.g., 5 GHz) probe request, the example embodiments enable the processor circuit 42 of the WAP 12 to output the 5 GHz higher-band probe response (in response to the 2.4 GHz low-band probe request) while suppressing the 2.4 GHz low-band response, eliminating the necessity of waiting for the 5 GHz higher-band probe request. Further, the example embodiments enable steering the multiple-band capable wireless client device 18 to the higher band 26 that is optimized for the wireless client device 18, enabling the wireless client device 18 to avoid the more congested lower band 24.

Hence, the sample embodiments can accelerate the attachment of a wireless client device 18 to a WAP 12 based on outputting a probe response based solely on the MAC address 28 of the client device 18. Following attachment of the wireless client device 18 to the WAP 12, the processor circuit 42 of the WAP 12 in operation 64 can detect attachment of the new wireless client device, determine the actual frequency band capabilities, and forward the determined frequency band capabilities for updating of the pattern 22.

According to example embodiments, analytics and machine-based classification can be utilized to predict frequency band capabilities of wireless network devices and accelerate attachment of the wireless client devices in a high-density network, ensuring that wireless client devices can be steered to optimized wireless bands to provide maximum performance for newer client devices operating at higher frequency bands 26, while reducing congestion on lower frequency bands 24 for older client devices operating only at the lower frequency bands. Although the example embodiments illustrated the low band 24 at a frequency of around 2.4 GHz and the higher band 26 at a frequency of about 4.915-5.825 GHz, the frequency values are by way of illustration only, and other frequencies could be used, as appropriate.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by an apparatus, a pattern of operable frequency band capabilities of wireless client devices relative to respective wireless Media Access Control (MAC) addresses of the wireless client devices, the determining based on a machine-based classification of the wireless client device capabilities relative to the respective MAC addresses, the pattern of operable frequency band capabilities enabling prediction of a corresponding operable frequency band capabilities of a new wireless client device based solely on a corresponding MAC address of the new wireless client device;
   predicting the corresponding operable frequency band capabilities of the new wireless client device solely by applying the corresponding MAC address of the new wireless client device to the pattern; and
   steering the new wireless client device to an available wireless band in response to the predicted operable frequency band capabilities of the new wireless client device, the apparatus implemented as a network device distinct from any one of the wireless client devices.

2. The method of claim 1, further comprising the apparatus executing the machine-based classification of the wireless client devices based on respective access attempts by the wireless client devices.

3. The method of claim 1, wherein the determining includes receiving the pattern from a network device in communication with the apparatus.

4. The method of claim 1, wherein the steering includes outputting a higher-band probe response to a low-band probe request received from the new wireless client device while suppressing a low-band response associated with a low band, enabling the new wireless client device to attach at a higher band associated with the higher-band probe response and not the low band.

5. The method of claim 1, wherein:
   the pattern identifies the wireless client devices as at least one of low-band-only capable for a low band, high-band-only for a high band, or multi-band capable at the low band and the high band, the multi-band capable identifying a corresponding wireless client device as operable at the low band and a higher-band;
   the predicting includes identifying the new wireless client device as multi-band capable; and
   the steering includes outputting a higher-band probe response to a low-band probe request from the new wireless client device while suppressing a low-band response.

6. The method of claim 1, wherein:
   the predicting includes identifying the new wireless client device as low-band-only capable for a low band; and
   the steering includes outputting a low-band probe response to a low-band probe request from the new wireless client device without waiting for any higher-band probe request.

7. The method of claim 1, further comprising:
   detecting an attachment by the new wireless client device to the apparatus;
   determining the operable frequency band capabilities of the new wireless client device in response to the attachment; and
   forwarding the operable frequency band capabilities of the new wireless client device to the machine-based classification for updating of the pattern.

8. The method of claim 1, wherein the determining is based on:
   creating a feature vector representation for each of the MAC addresses according to a prescribed decomposition format; and
   classifying the feature vector representations according to any one of one or more decision trees, a neural network, a Bayesian network, or a support vector machine.

9. An apparatus comprising:
   a device interface circuit; and
   a processor circuit configured for determining a pattern of operable frequency band capabilities of wireless client devices relative to respective wireless Media Access Control (MAC) addresses of the wireless client devices, the processor circuit configured for determining the pattern based on executing a machine-based classification of the wireless client device capabilities relative to the respective MAC addresses, the pattern of operable frequency band capabilities enabling prediction of a corresponding operable frequency band capabilities of a new wireless client device based solely on a corresponding MAC address of the new wireless client device;
   the processor circuit further configured for causing predicting of the corresponding operable frequency band capabilities of the new wireless client device solely by applying the corresponding MAC address of the new wireless client device to the pattern;

the processor circuit further configured for causing steering of the new wireless client device to an available wireless band in response to the predicted operable frequency band capabilities of the new wireless client device, based on outputting a response via the device interface circuit, the apparatus implemented as a network device distinct from any one of the wireless client devices.

10. The apparatus of claim 9, wherein the processor circuit is configured for executing the machine-based classification of the wireless client devices based on respective access attempts by the wireless client devices.

11. The apparatus of claim 9, wherein the processor circuit is configured for supplying the pattern to a network device in communication with the apparatus, enabling the network device to execute any one of the classifying or the steering of the new wireless client device.

12. The apparatus of claim 9, wherein the steering includes outputting a higher-band probe response to a low-band probe request received from the new wireless client device while suppressing a low-band response associated with a low band, enabling the new wireless client device to attach at a higher band associated with the higher-band probe response and not the low band.

13. The apparatus of claim 9, wherein:
the pattern identifies the wireless client devices as at least one of low-band-only capable for a low band, high-band-only for a high band, or multi-band capable at the low band and the high band, the multi-band capable identifying a corresponding wireless client device as operable at the low band and a higher-band;
the predicting includes identifying the new wireless client device as multi-band capable; and
the steering includes outputting a higher-band probe response to a low-band probe request from the new wireless client device while suppressing a low-band response.

14. The apparatus of claim 9, wherein:
the predicting includes identifying the new wireless client device as low-band-only capable for a low band; and
the steering includes outputting a low-band probe response to a low-band probe request from the new wireless client device without waiting for any higher-band probe request.

15. The apparatus of claim 9, wherein the processor circuit is configured for determining the operable frequency band capabilities of the new wireless client device based on the new wireless client device having attached to a network device, and in response causing for updating of the pattern by the machine-based classification.

16. The apparatus of claim 9, wherein the determining is based on:
creating a feature vector representation for each of the MAC addresses according to a prescribed decomposition format; and
classifying the feature vector representations according to any one of one or more decision trees, a neural network, a Bayesian network, or a support vector machine.

17. One or more non-transitory tangible media encoded with logic for execution by a physical machine and when executed by the physical machine operable for:
determining a pattern of operable frequency band capabilities of wireless client devices relative to respective wireless Media Access Control (MAC) addresses of the wireless client devices, the determining based on a machine-based classification of the wireless client device capabilities relative to the respective MAC addresses, the pattern of operable frequency band capabilities enabling prediction of a corresponding operable frequency band capabilities of a new wireless client device based solely on a corresponding MAC address of the new wireless client device;
predicting the corresponding operable frequency band capabilities of the new wireless client device solely by applying the corresponding MAC address of the new wireless client device to the pattern; and
steering the new wireless client device to an available wireless band in response to the predicted operable frequency band capabilities of the new wireless client device, the physical machine implemented as a network device distinct from any one of the wireless client devices.

18. The one or more non-transitory tangible media of claim 17, wherein the steering includes outputting a higher-band probe response to a low-band probe request received from the new wireless client device while suppressing a low-band response associated with a low band, enabling the new wireless client device to attach at a higher band associated with the higher-band probe response and not the low band.

19. The one or more non-transitory tangible media of claim 17, wherein:
the pattern identifies the wireless client devices as at least one of low-band-only capable for a low band, high-band-only for a high band, or multi-band capable at the low band and the high band, the multi-band capable identifying a corresponding wireless client device as operable at the low band and a higher-band;
the predicting includes identifying the new wireless client device as multi-band capable; and
the steering includes outputting a higher-band probe response to a low-band probe request from the new wireless client device while suppressing a low-band response.

20. The one or more non-transitory tangible media of claim 17, wherein:
the predicting includes identifying the new wireless client device as low-band-only capable for a low band;
the steering includes outputting a low-band probe response to a low-band probe request from the new wireless client device without waiting for any higher-band probe request.

* * * * *